(12) United States Patent
Kim et al.

(10) Patent No.: US 12,465,858 B2
(45) Date of Patent: Nov. 11, 2025

(54) METHOD OF CREATING INTERACTION-BASED COOPERATIVE AGENT, METHOD OF PROVIDING COOPERATIVE AGENT, AND AGENT MANAGEMENT SERVER FOR PERFORMING METHODS

(71) Applicant: Electronics and Telecommunications Research Institute, Daejeon (KR)

(72) Inventors: Daewook Kim, Daejeon (KR); Sung Yun Park, Daejeon (KR); Seong Il Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 545 days.

(21) Appl. No.: 17/966,411

(22) Filed: Oct. 14, 2022

(65) Prior Publication Data

US 2023/0233944 A1    Jul. 27, 2023

(30) Foreign Application Priority Data

Jan. 26, 2022    (KR) .......................... 10-2022-0011530

(51) Int. Cl.
*A63F 13/67*    (2014.01)

(52) U.S. Cl.
CPC .................................. *A63F 13/67* (2014.09)

(58) Field of Classification Search
CPC ........ A63F 13/67; A63F 13/35; A63F 13/785; G06N 3/006; G06N 20/00
See application file for complete search history.

(56) References Cited

U.S. PATENT DOCUMENTS

| | | | |
|---|---|---|---|
| 2012/0129595 | A1 | 5/2012 | Kim et al. |
| 2014/0243056 | A1 | 8/2014 | Lee et al. |
| 2016/0005270 | A1 | 1/2016 | Marr et al. |
| 2016/0166935 | A1 | 6/2016 | Condrey et al. |
| 2020/0269139 | A1 | 8/2020 | Aghdaie et al. |
| 2021/0201148 | A1* | 7/2021 | Li ..................... G06F 18/24323 |
| 2021/0346798 | A1* | 11/2021 | Borovikov ............ A63F 13/352 |
| 2022/0122001 | A1* | 4/2022 | Choe ..................... G06N 20/20 |

FOREIGN PATENT DOCUMENTS

| | | |
|---|---|---|
| KR | 10-2020-0070677 | 6/2020 |
| KR | 10-2021-0003687 | 1/2021 |
| KR | 10-2021-0070612 | 6/2021 |
| KR | 10-2021-0085894 | 7/2021 |

OTHER PUBLICATIONS

Lee et al., "Research Trends on Inverse Reinforcement Learning", ETRI Electronics and Telecommunications Trends, Dec. 2019, pp. 100-107.

* cited by examiner

*Primary Examiner* — Thomas H Henry
(74) *Attorney, Agent, or Firm* — KILE PARK REED & HOUTTEMAN PLLC

(57) ABSTRACT

Provided is a method of automatically creating an agent that may interact with a user in a video game and providing a pre-created agent upon request of the user playing the video game when there is no user to play the video game.

15 Claims, 5 Drawing Sheets

| Agent<br>Combination | A | | | B | |
|---|---|---|---|---|---|
| Case ① | Risk aversion | Close distance | | Action success | Attack hit |
| Case ② | Risk aversion | Energy exhaustion + energy restoration | | Tool use | Frequency of use ↑ |
| ⋮ | ⋮ | ⋮ | | ⋮ | ⋮ |

METHOD OF CREATING INTERACTION-BASED COOPERATIVE AGENT, METHOD OF PROVIDING COOPERATIVE AGENT, AND AGENT MANAGEMENT SERVER FOR PERFORMING METHODS

CROSS-REFERENCE TO RELATED APPLICATION

This application claims the benefit of Korean Patent Application No. 10-2022-0011530 filed on Jan. 26, 2022, in the Korean Intellectual Property Office, the entire disclosure of which is incorporated herein by reference for all purposes.

BACKGROUND

1. Field of the Invention

One or more example embodiments relate to a method of creating a cooperative agent, a method of providing a cooperative agent, and an agent management server, and more particularly, to technology for dealing with general users, automatically creating an interactable agent, and providing the interactable agent when there is no general user to play a video game requiring a plurality of general users.

2. Description of the Related Art

The development of artificial intelligence technology allows an agent of a video game to derive a policy to play an optimal strategy in a given game environment based on the agent's own simulation and learning. Video games may be largely classified into Player VS Environment (PvE) and Player VS Player (PvP).

PvE may have a confrontation structure between a computer and a user and suggest a game method in which the user simply clears a specified level. An agent based on PvE may continue to simulate in each environment provided by a video game to derive an optimal strategy.

PvP may have a confrontation structure between users and control a game method in which two users compete against one another. An agent based on PvP may derive an optimal strategy based on a self-match.

However, in addition to the foregoing video games, there are countless games in PvE requiring two or more users or games in PvP requiring three or more users. Since these games need communication among users, existing learning technology may have limitations on deriving the optimal strategy.

Recently, there have been studies on having two or more agents learn and perform a collaborative task in order to derive the optimal strategy based on agent learning technology, but such studies have limitations on replacing all users with agents to perform a specific task.

After all, the absence of technology allowing a user and an agent to actually communicate with each other at the same level in a video game may lead to the inability to collaborate with people.

SUMMARY

One or more example embodiments provide a method of creating a plurality of agents that may collaborate with a general user upon request of the general user by performing imitation learning on a game action of general users participating in a video game.

One or more example embodiments provide a method of providing an agent that may collaborate by replacing a general user according to teammate matching when there is no general user to proceed with a video game requiring a plurality of general users.

According to an aspect, there is provided a method of creating a cooperative agent, the method including collecting data on game actions of each of general users participating in a video game, performing clustering on game action data, in which a similar play is performed, by analyzing the game action data on the game action of each of the general users, and creating an agent capable of collaborating with the general users by applying imitation learning (IL) to the clustered game action data.

The collecting of the game action data according to an example embodiment may include collecting the game action data including state information about an event provided in each stage of the video game and action information about interaction performed in a process of playing the video game based on the state information.

The performing of the clustering on the game action data according to an example embodiment may include performing the imitation learning based on at least one of ① behavior cloning (BC), ② apprentice learning (AL), and ③ inverse reinforcement learning (IRL) to sequentially imitate an action characteristic of the general users from a policy of the video game.

When the imitation learning is performed by the BC, the performing of the clustering on the game action data may include collecting a demonstration trajectory on a game action of the general users based on state information and action information, which constitute the game action data, performing the BC regarding the policy of the video game, based on the demonstration trajectory on the game action of the general users, and performing the imitation learning with respect to the clustered game action data through the performed BC.

When the imitation learning is performed by the AL, the performing of the clustering on the game action data according to an example embodiment may include collecting a demonstration trajectory on a game action of a professional user with respect to the video game, performing the AL with respect to the policy of the video game, based on a reward function generated from the collected demonstration trajectory, and performing the imitation learning on the clustered game action data through the performed AL.

When the imitation learning is performed by the IRL, the performing of the clustering on the game action data according to an example embodiment may include performing the IRL with respect to the policy of the video game, based on a reward function generated by at least one of a pre-generated agent policy and game action data on the video game collected from a previous user, performing the imitation learning with respect to the clustered game action data through the performed IRL.

The method of creating the cooperative agent according to an example embodiment may further include forming an agent pool including the created agent, and evaluating a collaboration capability between a plurality of agents in the video game by extracting the plurality of agents included in the agent pool.

According to an aspect, there is provided a method of providing a cooperative agent, the method including identifying whether teammate matching succeeds for general users participating in a video game to proceed with the video game, executing a stage of the video game by loading at least one agent stored in an agent pool when the teammate matching fails, and providing an agent capable of collaborating with the general users participating in a stage when the stage of the video game is executed. The agent capable of collaborating may be created through imitation learning to sequentially imitate an action characteristic of the general users from a policy of the video game, based on game action data on a game action of each of the general users.

The identifying of whether the teammate matching succeeds according to an example embodiment may include identifying whether the teammate matching succeeds for the general users participating the video game to be either an ally or an enemy, according to the policy of the video game.

The providing of the agent capable of collaborating according to an example embodiment may include providing the agent capable of collaborating in a form of assisting a game action of the general users playing the stage.

The providing of the agent capable of collaborating according to an example embodiment may include providing the agent capable of collaborating in a form in which the general users assist a game action of the agent in response to an event provided by the stage.

The providing of the agent capable of collaborating according to an example embodiment may include adjusting and providing the agent capable of collaborating with the general users considering whether the stage of the video game is over.

According to an aspect, there is provided a server for managing an agent, the server including a processor. The processor may be configured to create an agent capable of collaborating with general users according to imitation learning by using game action data on a game action of each of the general users participating in a video game, evaluate a collaboration capability between a plurality of agents in the video game by extracting the plurality of agents included in an agent pool after creating the agent pool including the create agent, and provide an agent capable of collaborating with the general users participating in a stage of the video game considering whether teammate matching succeeds for the general users participating in the video game.

The processor according to an example embodiment may perform clustering on game action data, in which a similar play is performed, by analyzing the game action data on each of the general users and creating an agent capable of collaborating with the general users by applying the imitation learning to the clustered game action data.

When the imitation learning is performed by using BC, the processor may be configured to collect a demonstration trajectory on the game action of the general users, based on state information and action information, which constitute the game action data, perform the BC with respect to a policy of the video game, based on the demonstration trajectory on the game action of the general users, and perform the imitation learning with respect to clustered game action data through the performed BC.

When the imitation learning is performed by using AL, the processor may be configured to collect a demonstration trajectory on a game action of a professional user with respect to the video game, perform the AL with respect to a policy of the video game, based on a reward function created from the collected demonstration trajectory, and perform the imitation learning on clustered game action data through the performed AL.

When the imitation learning is performed by using IRL, the processor may be configured to perform the IRL with respect to a policy of the video game, based on a reward function created by at least one of a pre-generated agent policy or game action data on the video game collected from a previous user, and perform the imitation learning with respect to clustered game action data through the performed IRL.

The processor according to an example embodiment may be configured to provide the agent capable of collaborating by assisting a game action of the general users playing the stage.

The processor according to an example embodiment may be configured to provide the agent capable of collaborating in a form in which the general users assist a game action of the agent in response to an event provided by the stage.

The processor according to an example embodiment may adjust and provide the agent capable of collaborating with the general users considering whether the stage of the video game is over.

Additional aspects of example embodiments will be set forth in part in the description which follows and, in part, will be apparent from the description, or may be learned by practice of the disclosure.

According to example embodiments, a method of creating a cooperative agent may perform imitation learning on a game action of users participating in a video game and create an agent which may interact with a user, according to a video game type.

According to example embodiments, a method of creating a cooperative agent may evaluate collaboration capability between agents based on an agent pool including agents that may collaborate with users in order to create a plurality of agents that may be injected for each stage of a video game.

According to example embodiments, a method of providing a cooperative agent may provide an agent that may collaborate with a user for the user's greater game experience when there is no other user to proceed with a video game requiring a plurality of users.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
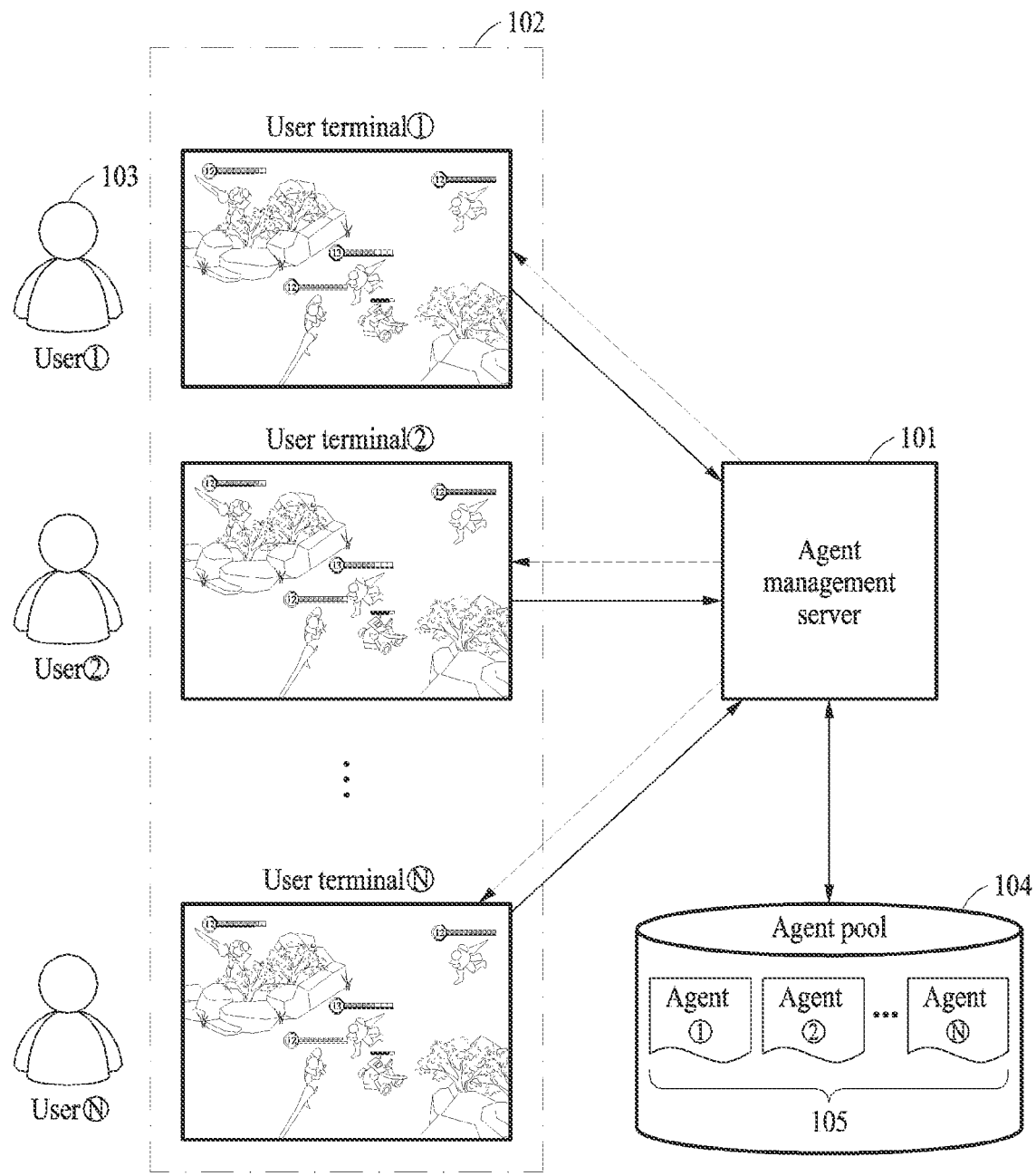
FIG. 1 is a diagram illustrating an overall operation of automatically creating a cooperative agent and providing the cooperative agent, according to an example embodiment.

FIG. 1 is a diagram illustrating an overall operation of automatically creating and providing a cooperative agent, according to an example embodiment.

Referring to FIG. 1, an agent management server 101 may collect game action data of general users 103 participating in a video game from user terminals 102. The agent management server 101 may create an agent that may collaborate with a general user according to imitation learning, based on game action data on a game action of each of the general users 103 participating in the video game. In detail, the agent management server 101 may analyze the game action data of each of the general users 103 and perform clustering on game action data in which a similar play is performed. The agent management server 101 may apply the imitation learning to the clustered game action to create an agent 105 that may collaborate with the general users 103. The agent management server 101 may store the agent 105 in an agent pool 104.

The agent management server 101 may extract agents included in the agent pool 104 and evaluate collaboration capability between the agents in the video game. The agent management server 101 may evaluate play between agents acting differently from one another, based on a method of controlling a character in the video game played by each general user. The agent management server 101 may manage a collaboration score and ranking information for a combination of agents, based on success or performance in the video game.

The agent management server 101 may provide an agent that may collaborate with the general users 103 participating in a stage of the video game considering whether teammate matching succeeds for the general users 103 participating in the video game. Here, the agent management server 101 may provide an agent that may collaborate by assisting the game action of the general users 103 playing the stage. In addition, the agent management server 101 may provide an agent that may collaborate where the general users 103 assist the agent's game action in response to an event provided in the stage.

As a result, the present disclosure may provide technology for replacing all the general users performing the event provided by the video game with agents, based on a technique allowing two or more agents to learn. In addition, according to the present disclosure, a general user and an agent may communicate with each other at the same level, thus enabling collaboration between the general user and the agent.

Figure 2:
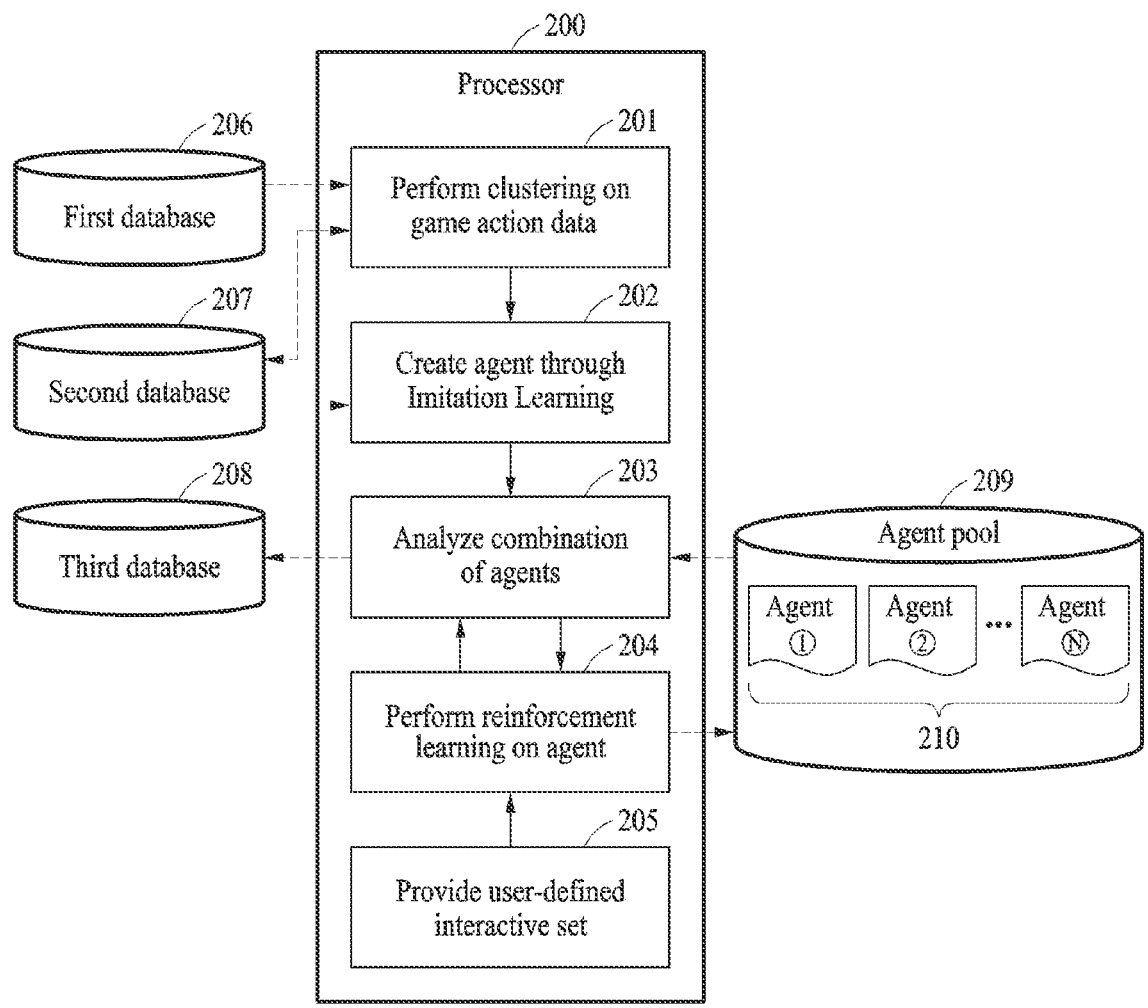
FIG. 2 is a diagram illustrating an operation of an agent management server, according to an example embodiment.

FIG. 2 is a diagram illustrating in detail an operation of an agent management server according to an example embodiment.

Referring to FIG. 2, an agent management server may include a processor 200 and the processor 200 may automatically create an agent that may collaborate based on interaction.

In operation 201, the processor 200 may collect game action data on a game action of each of general users participating in a video game. In this case, the processor 200 may collect the game action data of the general users in association with a first database 206.

The processor 200 may perform clustering on the game action data on the game action. Here, the game action data may refer to data on actions actually taken by the general users in the video game that is being serviced live. The game action data may be a combination of state information and action information according to a data format of the general users. As an example, the game action data has a form of performing 'action B' in 'state A' in the video game and may indicate a correlation between the state information and the action information.

The processor 200 may analyze the game action data of each of the general users to perform clustering on the game action data in which a similar play is performed. That is, the general users may perform various pieces of action information in response to one piece of state information and the same state information. The processor 200 may perform clustering considering the similarity between the game action data of the general users. That is, the processor 200 may group the general users performing a similar action for the same state information. The processor 200 may store and manage the clustered game action data in a second database 207.

For example, the processor 200 may group the general users based on at least one clustering method of K-Means Clustering, Density-based Spatial Clustering of Applications with Noise (DB SCAN), Spectral Clustering, and the like. Here, the clustered game action data may correspond to output data.

In operation 202, the processor 200 may select one cluster from among the clustered game action data to perform imitation learning. The processor 200 may create an agent which may replace a general user through the imitation learning. The processor 200 may use one of behavior cloning, apprentice learning, and inverse reinforcement learning to perform the imitation learning for the cluster. Here, when there are N clusters, the number of agents created by the imitation learning is equal to N and all agents may be stored in an agent pool 209.

In more detail, the processor 200 may select two or more agents from among the clustered game action data to perform the imitation learning. The processor 200 may perform the imitation learning played at an appropriate skill level, based on the selected two or more agents and create N agents.

As a result, the processor 200 may be trained by the imitation learning for a control command and a game action that the general users tend to take in various game situations or states. As a result of training, the processor 200 may be configured to predict an action that is likely to be taken in the game by the general users in a given game state.

In operation 203, the processor 200 may select agents 210 from the agent pool 209 to evaluate how well the agents 210 may collaborate with each other. A collaboration score and ranking information determined based on the evaluation may be stored and managed in a third database. The third database may be a storage in which matching information between the agents 210 is stored.

In the present disclosure, each agent may not currently exist but may be a potential agent which may show better performance than a combination with other existing agents.

In operation 204, the processor 200 may perform reinforcement learning on agents to discover the potential agent. The processor 200 may create an agent having a greater collaboration capability than the agents 210 pre-stored in the agent pool 209, based on the reinforcement learning for the agents. The processor 200 may additionally store the created agents in the agent pool 209, thereby creating various types of agents.

In this case, the present disclosure may automatically create a collaborative agent to provide a method of assisting a general user when the general user performs a specific action or strategy in the video game. In addition, in the present invention, there may be a general user who desires a method in which an agent performs a specific action in a specific situation and the general user assists the agent.

In operation 205, the processor 200 may provide a user-defined interactive set as predefined information on a specific action or strategy in a specific situation. The processor 200 may reflect the user-defined interactive set to create an agent specialized in the specific action or strategy.

Figures 3A, 3B:
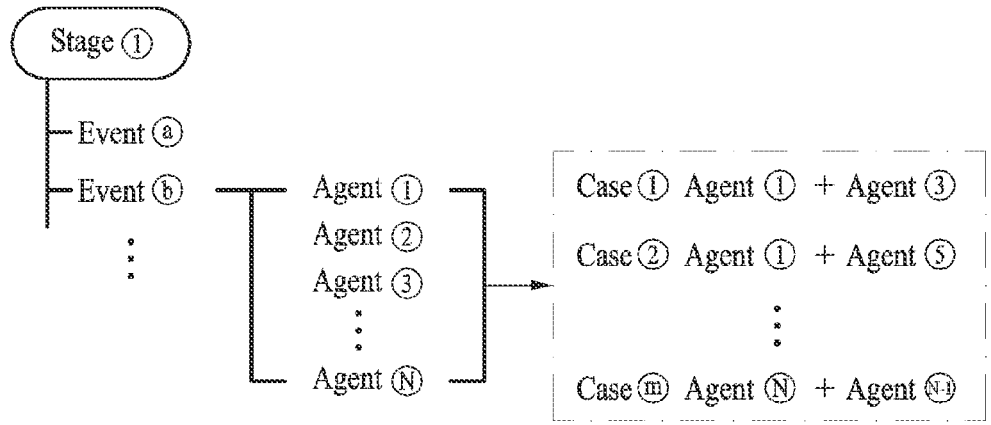
FIGS. 3A and 3B are diagrams illustrating a process of creating a plurality of agents through imitation learning, according to an example embodiment.

FIGS. 3A and 3B are diagrams illustrating a process of creating a plurality of agents through imitation learning, according to an example embodiment.

Referring to FIG. 3A, an agent management server may provide stages included in a video game. The stages may be a representative media space of the video game and a place where continuous interaction with general users and social relationships similar to the real world are established so that the general users may play. Each of the stages may include events, which may be a match which induces game experience, such as fighting a virtual enemy or moving a virtual object in the video game.

The agent management server may collect game action data changed for general users to obtain experience, in response to each event exposed to the general users. The agent management server may collect the game action data reflecting interactions of the general users based on a shared event in real time, and may continuously update a game status of the general users until the game is over.

In one example, the game action data may include whether to press a button to perform an action to which a unit or a character is assigned and/or other input data. That is, the game action data may be information collected through various input devices and input formats, such as a controller, a mouse, a keyboard, a voice, a touch screen, a gesture, and the like.

In addition, the game action data may include an actual button press, a mouse click, a gesture, or other information. The game action data may be converted into an in-game action in each event. Such a conversion into the in-game action may correspond to a general user selecting deployment of troops at a specific in-game map coordinate, such as a character in a video game firing a gun or turning left 90 degrees.

The agent management server may analyze the game action data and perform clustering on the game action data in which a similar play is performed. The agent management server may create an agent that may collaborate with a general user by applying imitation learning to the clustered game action data.

Referring to FIG. 3B, the agent management server may select agents in an agent pool and evaluate how well the agents cooperate with each other. The agent management server may form cases according to a combination of two or more agents and store and manage collaboration scores and ranking information for evaluating the formed cases in a separate database.

That is, the agent management server may create an agent trained among general users in response to each event. The agent management server may evaluate a play between agents acting differently from each other, based on a method of controlling a character in the video game played by each general user. In an example, the agent management server may extract an agent playing against a competitor of a general user in the video game. The agent management server may track winning a match in the video game or a success of a character according to the extracted agent. The agent management server may manage a collaboration score and ranking information for a combination of agents, based on the success or performance in the video game.

Figure 4:
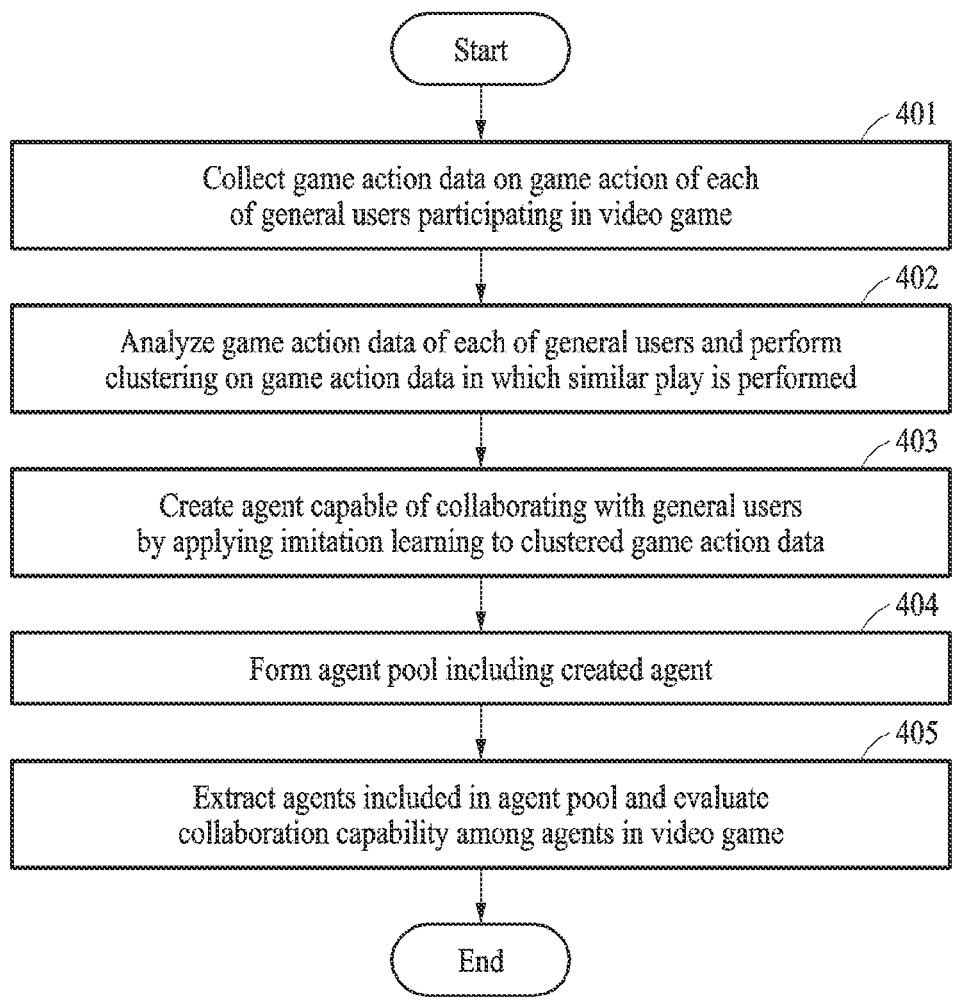
FIG. 4 is a flowchart illustrating a method of creating a cooperative agent, according to an example embodiment.

FIG. 4 is a flowchart illustrating a method of creating a cooperative agent, according to an example embodiment.

In operation 401, an agent management server may collect game action data on a game action of each of general users participating in a video game. The agent management server may collect the game action data from the general users participating in the video game. The game action data may include state information and action information. The state information may be about an event provided in each stage of the video game, and the action information may be about interaction performed in a process of playing the video game, based on the state information.

In operation 402, the agent management server may analyze the game action data of each of the general users and perform clustering on the game action data in which a similar play is performed. The agent management server may perform imitation learning using at least one of ① behavior cloning (BC), ② apprentice learning (AL), and ③ inverse reinforcement learning (IRL) to sequentially imitate an action characteristic of the general users from a policy of the video game.

① Behavior Cloning (BC)

The agent management server may collect a demonstration trajectory of a general user's game action based on the state information and the action information constituting the game action data when imitation learning is performed based on the BC. The agent management server may perform the BC for a policy of a video game, based on the demonstration trajectory of the general user's game action. The agent management server may perform the imitation learning on the clustered game action data through the BC.

② Apprentice Learning (AL)

The agent management server may collect a demonstration trajectory of a game action of a professional user related to a video game when imitation learning is performed using the AL. The agent management server may perform the AL on a policy of a video game, based on a reward function generated from the collected demonstration trajectory. The agent management server may perform the imitation learning on the clustered game action data through the AL.

③ Inverse Reinforcement Learning (IRL)

When the agent management server performs imitation learning using the IRL, the agent management server may perform the IRL on a policy of a video game, based on a reward function generated by at least one of an agent policy or game action data collected from previous users for the video game. The agent management server may perform imitation learning on the clustered game action data through the IRL.

In operation 403, the agent management server may create an agent that may collaborate with a general user by applying the imitation learning to the clustered game action data. Here, when there are N clustered clusters, the number of agents created through the imitation learning may be equal to N.

In operation 404, the agent management server may form an agent pool including an automatically created agent. That is, when there are N agents created through the imitation learning, all agents may be stored in the agent pool.

In operation 405, the agent management server may extract agents included in the agent pool and evaluate a collaboration capability between the agents in the video game. In detail, the agent management server may select two or more agents from the agent pool and evaluate how cooperative a combination of the two or more agents is. The agent management server may store, in a third database, a collaboration score and ranking information between the two or more agents determined based on evaluation.

Figure 5:
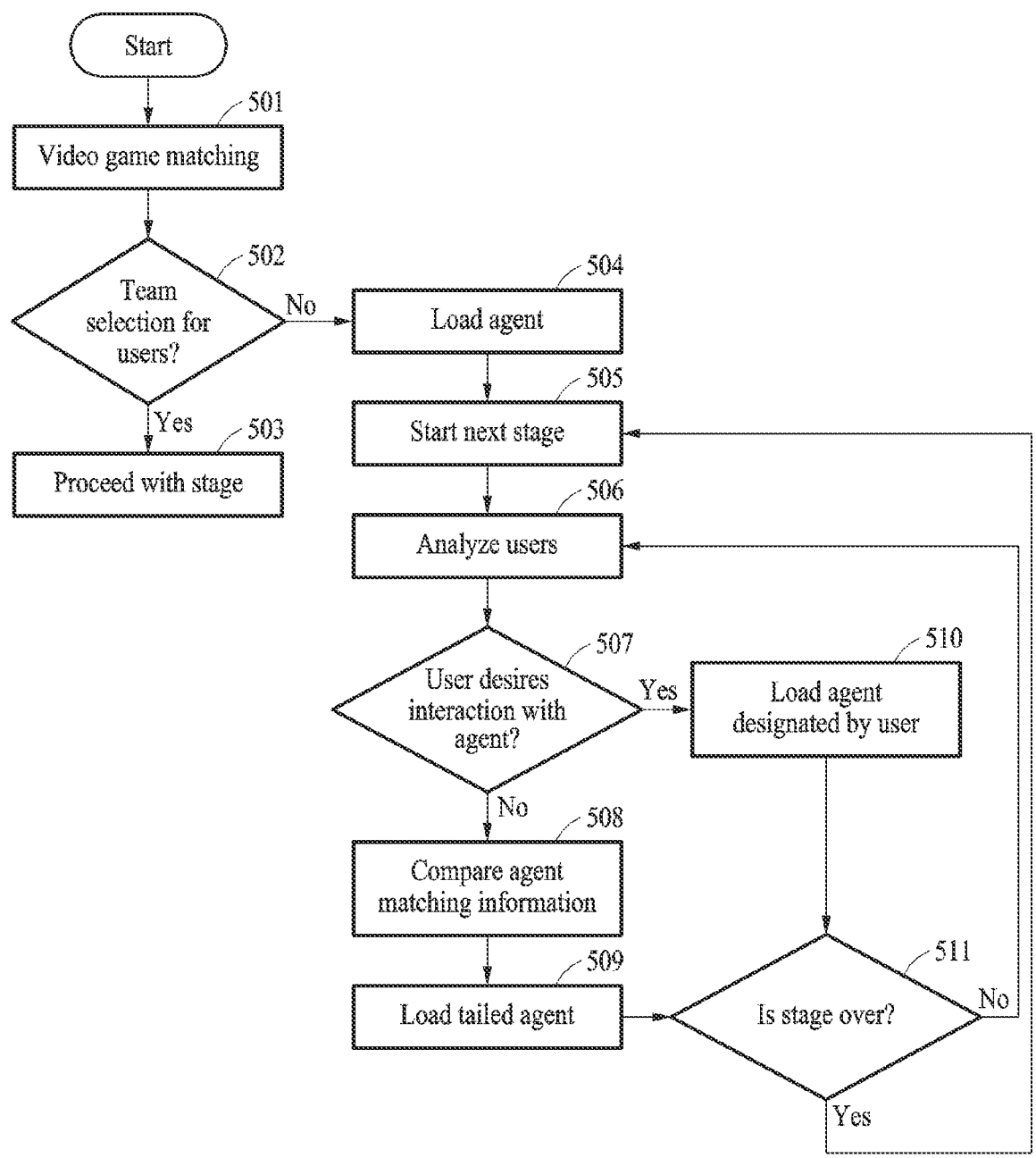
FIG. 5 is a flowchart illustrating a method of providing a cooperative agent, according to an example embodiment.

FIG. 5 is a flowchart illustrating a method of providing a cooperative agent according to an example embodiment.

In operation 501, an agent management server may perform teammate matching to proceed with a video game for general users participating in the video game. In detail, the agent management server may automatically perform the teammate matching considering game skills of the general users participating in the video game. For example, the agent management server may select teams according to a team unit, the number of team members, a level, a stage, and the like based on properties of the video game.

In operation 502, the agent management server may identify whether the teammate matching for the general users participating in the video game is determined to proceed with the video game. The agent management server may identify whether the teammate matching succeeds for the general users participating in the video game to be an ally or an enemy, according to a policy of the video game.

When the teammate matching succeeds (e.g., Yes to operation 502), the agent management server may start a stage of the video game in operation 503.

When the teammate matching is not determined (e.g., No to operation 502), the agent management server may load at least one agent stored in the agent pool in operation 504. The agent management server may load a game image measured by a demonstration of the video game in order to provide a game screen to the general user.

In operation 505, the agent management server may execute a stage of the video game, based on the loaded game image. The agent management server may execute the stage of the video game considering a record of a previously experienced video game or a record of a new play.

In operation 506, the agent management server may analyze skills of the general users whose team has been matched according to the stage of the executed video game.

In operation 507, the agent management server may identify whether the general users participating in the stage of the video game have requested interaction with an agent.

When the agent is requested (e.g., No to operation 507), in operation 508, the agent management server may use a collaboration score and ranking information pre-stored in the third database to compare agent matching information.

In operation 509, the agent management server may load an agent that may collaborate in the video game considering the comparison result. The agent management server may provide an agent that may collaborate by assisting a game action of the general users playing the stage. In addition, the agent management server may provide the agent that may collaborate in a form in which the general users assist the agent's game action, in response to an event provided by the stage.

When the agent is not requested (e.g., Yes to operation 507), in operation 510, the agent management server may load an agent designated by the general user from the agent pool. In addition, the agent management server may proceed with the stage of the video game in which the general users participate in collaboration with the agent loaded from the agent pool.

In operation 511, the agent management server may identify whether the stage of the video game is over.

When the stage is over (e.g., Yes to operation 511), the agent management server may return to operation 505 to start the next stage according to completion of the current stage.

When the stage is not over (e.g., No to operation 511), the agent management server may return to operation 506 to analyze a collaboration state between the general users and the agent participating in the stage of the video game. Accordingly, the agent management server may analyze the collaboration state between the general users and the agent in order to adjust the agent that may collaborate with the general users considering whether the stage of the video game is over.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of creating a cooperative agent, performed by an agent management server, the method comprising:
    collecting game action data on a game action of each of general users participating in a video game;
    performing clustering on game action data, in which a similar play is performed, by analyzing the game action data on the game action of each of the general users;
    creating an agent capable of collaborating forming an agent pool with the general users by applying imitation learning (IL) to the clustered game action data, wherein the creating the agent capable of the collaborating comprises:
        extracting a first agent, which has been trained to imitate a first general user, and a second agent, which has been trained to imitate a second general user acting differently from the first general user, from the agent pool in response to events exposed to the general users;
        evaluating a level of collaboration between the first agent and the second agent to generate matching information including a score and a ranking associated with the collaboration between the first agent and the second agent; and
        generating the agent capable of collaborating based on the matching information according to each position of the general users; and
    providing, based on a stage of the video game being executed, the agent capable of collaborating according to the matching information either in a form that the agent capable of collaboration assists the game action of the general users, or in a form that the general users assist game actions of the agent capable of collaborating, based on each position of the general users participating in the stage.

2. The method of claim 1, wherein the collecting of the game action data comprises collecting the game action data comprising state information about an event provided in each stage of the video game and action information about interaction performed in a process of playing the video game based on the state information.

3. The method of claim 1, wherein the performing of the clustering on the game action data comprises performing the imitation learning based on at least one of ① behavior cloning (BC), ② apprentice learning (AL), and ③ inverse reinforcement learning (IRL) to sequentially imitate an action characteristic of the general users from a policy of the video game.

4. The method of claim 3, wherein the performing of the clustering on the game action data comprises, when the imitation learning is performed by using the BC:
    collecting a demonstration trajectory on a game action of the general users, based on state information and action information, which constitute the game action data;
    performing the BC regarding the policy of the video game, based on the demonstration trajectory on the game action of the general users; and
    performing the imitation learning with respect to the clustered game action data through the performed BC.

5. The method of claim 3, wherein the performing of the clustering on the game action data comprises, when the imitation learning is performed by using the AL:
    collecting a demonstration trajectory on a game action of a professional user with respect to the video game;
    performing the AL with respect to the policy of the video game, based on a reward function generated from the collected demonstration trajectory; and
    performing the imitation learning on the clustered game action data through the performed AL.

6. The method of claim 3, wherein the performing of the clustering on the game action data comprises, when the imitation learning is performed by using the IRL:
    performing the IRL with respect to the policy of the video game, based on a reward function generated by at least one of a pre-generated agent policy or game action data on the video game collected from a previous user; and
    performing the imitation learning with respect to the clustered game action data through the performed IRL.

7. A method of providing a cooperative agent, performed by an agent management server, the method comprising:
    identifying whether teammate matching succeeds for general users participating in a video game to proceed with the video game;
    forming an agent pool comprising a plurality of agents;
    executing a stage of the video game by loading at least one agent stored in the agent pool when the teammate matching is not determined; and
    providing, based on a stage of the video game being executed, agent capable of collaborating according to matching information including a score and a ranking associated with collaboration between the plurality of agents in the agent pool, either in a form that the agent capable of collaboration assists game action of the general users, or in a form that the general users assist game actions of the agent capable of collaborating, based on each position of the general users participating in the stage, wherein the agent capable of collaborating is created through imitation learning to sequentially imitate an action characteristic of the general users from a policy of the video game, based on game action data on a game action of each of the general users, and wherein the forming an agent pool comprises:
extracting a first agent, which has been trained to imitate a first general user, and a second agent, which has been trained to imitate a second general user acting differently from the first general user, from the agent pool in response to events exposed to the general users;

evaluating a level of collaboration between the first agent and the second agent to generate the matching information including the score and the ranking associated with the collaboration between the first agent and the second agent; and generating the agent capable of collaborating based on the matching information according to each position of the general users.

8. The method of claim 7, wherein the identifying of whether the teammate matching succeeds comprises identifying whether the teammate matching succeeds for the general users participating the video game to be either an ally or an enemy according to the policy of the video game.

9. The method of claim 7, wherein the providing of the agent capable of collaborating comprises adjusting and providing the agent capable of collaborating with the general users considering whether the stage of the video game is over.

10. A server for managing an agent, the server comprising a processor,
wherein the processor is configured to:
create an agent capable of collaborating with general users according to imitation learning by using game action data on a game action of each of the general users participating in a video game;
form an agent pool comprising the created agent;
evaluate a collaboration capability between a plurality of agents in the video game by extracting the plurality of agents comprised in an agent pool after creating the agent pool comprising the created agent; and
provide an agent capable of collaborating with the general users participating in a stage of the video game considering whether teammate matching succeeds for the general users participating in the video game,
wherein, for evaluating the collaboration capability, the processor is further configured to:
extract a first agent, which has been trained to imitate a first general user, and a second agent, which has been trained to imitate a second general user acting differently from the first general user, from the agent pool in response to events exposed to the general users; and
evaluate a level of collaboration between the first agent and the second agent to generate matching information including a score and a ranking associated with the collaboration between the first agent and the second agent, and wherein the processor is further configured to:
provide, based on a stage of the video game being executed, the agent capable of collaborating according to the matching information either in a form that the agent capable of collaboration assists the game action of the general users, or in a form that the general users assist game actions of the agent capable of collaborating, based on each position of the general users participating in the stage.

11. The server of claim 10, wherein the processor is configured to:
perform clustering on game action data, in which a similar play is performed, by analyzing the game action data on each of the general users; and
creating an agent capable of collaborating with the general users by applying the imitation learning to the clustered game action data.

12. The server of claim 10, wherein the processor is configured to, when the imitation learning is performed by using behavior cloning (BC):
collect a demonstration trajectory on the game action of the general users, based on state information and action information, which constitute the game action data;
perform the BC with respect to a policy of the video game, based on the demonstration trajectory on the game action of the general users; and
perform the imitation learning with respect to clustered game action data through the performed BC.

13. The server of claim 10, wherein the processor is configured to, when the imitation learning is performed by using apprentice learning (AL):
collect a demonstration trajectory on a game action of a professional user with respect to the video game;
perform the AL with respect to a policy of the video game based on a reward function created from the collected demonstration trajectory; and
perform the imitation learning on clustered game action data through the performed AL.

14. The server of claim 10, wherein the processor is configured to, when the imitation learning is performed by using inverse reinforcement learning (IRL):
perform the IRL with respect to a policy of the video game, based on a reward function created by at least one of a pre-generated agent policy or game action data on the video game collected from a previous user; and
perform the imitation learning with respect to clustered game action data through the performed IRL.

15. The server of claim 10, the processor is configured to adjust and provide the agent capable of collaborating with the general users considering whether the stage of the video game is over.

* * * * *